US012143350B2

(12) United States Patent
Gohr et al.

(10) Patent No.: US 12,143,350 B2
(45) Date of Patent: Nov. 12, 2024

(54) THREAD NAVIGATION FOR MESSAGING APPLICATIONS

(71) Applicant: GOOGLE LLC, Mountain View, CA (US)

(72) Inventors: Travis Andrew Gohr, San Francisco, CA (US); Fabio Carnevale Maffe, Santa Cruz, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/836,038

(22) Filed: Jun. 9, 2022

(65) Prior Publication Data

US 2023/0403248 A1 Dec. 14, 2023

(51) Int. Cl.
*G06F 15/16* (2006.01)
*H04L 51/216* (2022.01)
*H04L 51/42* (2022.01)

(52) U.S. Cl.
CPC ............ *H04L 51/216* (2022.05); *H04L 51/42* (2022.05)

(58) Field of Classification Search
CPC ..... H04L 51/216; H04L 51/42; H04L 67/535; H04L 51/224; H04L 51/234; H04L 51/56
See application file for complete search history.

(56) References Cited

U.S. PATENT DOCUMENTS 10,331,303 B1 * 6/2019 Gurtin .................. G06F 3/0482
11,070,502 B1 * 7/2021 Jayaram ................ H04L 51/08
11,481,236 B1 * 10/2022 Weiss .................... G06F 3/0482
11,611,523 B1 * 3/2023 Singh .................... H04L 51/216
2017/0255596 A1 * 9/2017 Rochelle ................ H04L 51/08
(Continued)

FOREIGN PATENT DOCUMENTS

CN 112035202 A 12/2020
CN 112073740 A 12/2020
JP 6524874 B2 * 6/2019

OTHER PUBLICATIONS

The Extended European Search Report for European Patent Application No. 22201089.4, May 15, 2023, 12 Pages.
(Continued)

*Primary Examiner* — Dustin Nguyen
*Assistant Examiner* — Hao H Nguyen
(74) *Attorney, Agent, or Firm* — Botos Churchill IP Law LLP

(57) ABSTRACT

The technology involves messaging applications that support message threads that can involve grouped messages pertaining a conversation, post, or topic. A user interface can employ a communication pane or other message area to present all threads in a particular room, not just the threads that the user is currently following. Following can occur when a user elects to be notified of new replies by clicking a "follow" indicia, replying to or starting a thread, or when someone else specifically mentions the user. The UI may present different notifications about new replies or other details based on a type of display device the person is currently using. For threads that include specific references to the user or are not currently being followed, graphical indicia can be presented as a tailored alert. Different filter options in the user interface enable the user to see threads they are following or mentioned in.

18 Claims, 17 Drawing Sheets

700

(56) References Cited

U.S. PATENT DOCUMENTS

| | | | | |
|---|---|---|---|---|
| 2017/0351385 | A1 | 12/2017 | Ertmann et al. | |
| 2019/0058680 | A1* | 2/2019 | Rosania | H04L 51/216 |
| 2019/0325064 | A1* | 10/2019 | Mathiesen | G06F 16/337 |
| 2020/0026783 | A1* | 1/2020 | Watanabe | G06F 16/176 |
| 2020/0382454 | A1* | 12/2020 | Gershony | H04L 51/02 |
| 2021/0044559 | A1* | 2/2021 | Jain | H04L 51/216 |
| 2021/0382590 | A1* | 12/2021 | Fong | H04L 51/42 |
| 2021/0400488 | A1* | 12/2021 | Frank | H04L 63/101 |
| 2022/0027021 | A1* | 1/2022 | Bliss | H04L 12/1822 |
| 2022/0029942 | A1 | 1/2022 | Wang et al. | |
| 2022/0038868 | A1* | 2/2022 | Locascio | H04L 67/02 |
| 2022/0052978 | A1* | 2/2022 | Gilad | H04L 51/42 |
| 2022/0086113 | A1* | 3/2022 | Baez | H04L 51/18 |
| 2022/0109645 | A1* | 4/2022 | Delp | G06F 3/0482 |
| 2022/0391059 | A1 | 12/2022 | Xu et al. | |
| 2023/0049885 | A1* | 2/2023 | Bakshi | H04M 1/72451 |

OTHER PUBLICATIONS

The First Office Action for Chinese Patent Application No. 202211200815.5, Jan. 4, 2024, 21 Pages.

* cited by examiner

100

120

200

300

Fig. 4A
402
Design Team
16 members
Chat
Files
Tasks
Emails
Texts
112
114
Josef
Does anyone know where the updated files have been moved to?
Carli
Just a reminder that we are meeting today to discuss the presentation.
Adam S.
Hi team. Did anyone find yesterday's training helpful?
Leo
Good idea -- Johnny, are you still available to handle?
Smythe
How can I help?
Nat K.
Look in the shared network folder
Remmy
Great idea! Let's get this going ASAP and let everyone know what they need to do
History is on
110

400

420

440

500

600

700

720

740

800

900

THREAD NAVIGATION FOR MESSAGING APPLICATIONS

BACKGROUND

People use client computing devices to communicate with others in a variety of ways. This includes making calls, conducting videoconferences, and interacting via different messaging applications that can include emails, chats, text chains, etc. Some messaging applications support group-based interactions. Here, message threads can help keep track of conversations associated with a specific topic or question. However, it may be difficult for a given user to discover new threads or otherwise navigate between many different threads. This can adversely impact the ability of the user to participate in certain conversations, and other people involved in those conversations may miss out on input to the topic or question at hand.

BRIEF SUMMARY

The technology relates to messaging applications that support message threads, where threads can involve grouped messages pertaining to the same conversation, post, or topic. Aspects of the technology enable a user to focus on a specific chat room or other messaging instance instead of an entire corpus of messages. For instance, a chat room is a messaging space or other virtual destination separate from the users, but which can be allocated or accessible to two or more users, for posting messages to the messaging space synchronously or asynchronously. By way of example, an email thread is not synchronous unless the users coordinate separately, and emails would be addressed to specific users and not the space.

The user interface can employ a communication pane or other message area to present all the threads in a particular room, not just the threads that the user is currently following. Following can occur when a user elects to be notified of new replies to a thread either by clicking a "follow" chip or other indicia, replying to a thread, starting a thread, or when someone else specifically mentions (e.g., "@mentions") the user in a thread. The user interface may present different notifications about new replies or other details based on a type of display device the person is currently using. For instance, the information associated with each thread may be presented in a manner suitable for a particular display arrangement. For threads that include specific references to the user (e.g., an @mention reference) or are not currently being followed, a "chip" or other graphical indicia can be presented to give the user a tailored alert. Different filter options in the user interface enable the user to see threads they are following or mentioned in, which can enhance their ability to identify and participate in relevant conversations.

According to one aspect, a computer-implemented method for managing threads in an electronic messaging application is provided. The method comprises: identifying, by one or more processors associated with the electronic messaging application, a plurality of threads corresponding to the electronic messaging application that are associated with a user account; determining, by the one or more processors, whether there are any new replies associated with any of the plurality of threads since a prior access of the electronic messaging application by the user account; in response to determining that there is at least one new reply associated with at least one of the plurality of threads, modifying a user interface for the electronic messaging application to alert a user of the user account of the at least one new reply; and generating for display on the user interface, by the one or more processors, indicia corresponding to a pair of filters, a first one of the pair of filters for visually indicating specific mentions of the user account in the plurality of threads, and a second one of the pair of filters for visually indicating any threads being followed by the user account.

The user interface may be configured to present at least a subset of the plurality of threads, the presentation of each thread in the subset including one or more of (i) user indicia of a user who sent an original message on which that thread is based, (ii) a timestamp of when the original message for that thread was sent, (iii) a snippet of the original message for that thread, (iv) a timestamp of a latest reply in that thread, or (v) an indication of one or both of a number of replies or number of unread replies in that thread. The user indicia may comprise one or both of an avatar or a name of the user who sent the original message. Alternatively or additionally, the snippet may include up to three lines of the original message. Alternatively or additionally, the user interface to present at least a subset of the plurality of threads is variable in appearance based on one or more display parameters of a display device associated with the user account. Alternatively or additionally, the indicia corresponding to the pair of filters may be displayable adjacent to a panel of the user interface presenting a set of active threads of the plurality of threads.

The method may further comprise: upon selection of the first filter, identifying instances of the specific mentions of the user account in the plurality of threads; and generating, for display within a panel of the user interface presenting a set of active threads of the plurality of threads, one or more chips to illustrate each active thread including the instances of the specific mentions of the user account. Alternatively or additionally, the method may further comprise: upon selection of the second filter, identifying instances of the threads currently being followed by the user account; and generating, for display within a panel of the user interface presenting a set of active threads of the plurality of threads, one or more chips to illustrate each active thread currently being followed by the user account. Alternatively or additionally, modifying the user interface may include modifying a thread panel to show active threads having new replies.

The method may further comprise: receiving an indication of user input associated with a given one of the plurality of threads; and in response to receiving the indication, modifying the user interface to identify that the given thread is selectable. Alternatively or additionally, the method may further comprise: determining, by the one or more processors, whether there are any new threads corresponding to the electronic messaging application; and upon determining that there is at least one new thread, configuring the user interface to present a follow indicator to alert the user of an option to follow the at least one new thread.

According to another aspect, a computing system is configured to manage threads in an electronic messaging application. The computing system comprises memory configured to store data associated with the electronic messaging application, and one or more processors operatively coupled to the memory. The processor(s) is configured to: identify a plurality of threads corresponding to the electronic messaging application that are associated with a user account; determine whether there are any new replies associated with any of the plurality of threads since a prior access of the electronic messaging application by the user account; in response to determining that there is at least one new reply associated with at least one of the plurality of threads, modify a user interface for the electronic messaging application to alert a user of the user account of the at least one new reply; and generate, for presentation via the user interface, indicia corresponding to a pair of filters, a first one of the pair of filters to visually indicate specific mentions of the user account in the plurality of threads, and a second one of the pair of filters to visually indicate any threads being followed by the user account.

The user interface may be configured to present at least a subset of the plurality of threads, the presentation of each thread in the subset including one or more of (i) user indicia of a user who sent an original message on which that thread is based, (ii) a timestamp of when the original message for that thread was sent, (iii) a snippet of the original message for that thread, (iv) a timestamp of a latest reply in that thread, or (v) an indication of one or both of a number of replies or number of unread replies in that thread. For instance, the user indicia may comprise one or both of an avatar or a name of the user who sent the original message, the snippet may include up to three lines of the original message, and/or the user interface may be variable in appearance based on one or more display parameters of a display device associated with the user account. Alternatively or additionally, the indicia corresponding to the pair of filters may be displayable adjacent to a panel of the user interface presenting a set of active threads of the plurality of threads.

The one or more processors may be further configured to: upon selection of the first filter, identify instances of the specific mentions of the user account in the plurality of threads; and generate, for display within a panel of the user interface presenting a set of active threads of the plurality of threads, one or more chips to illustrate each active thread including the instances of the specific mentions of the user account. Alternatively or additionally, the one or more processors may be further configured to: upon selection of the second filter, identify instances of the threads currently being followed by the user account; and generate, for display within a panel of the user interface presenting a set of active threads of the plurality of threads, one or more chips to illustrate each active thread currently being followed by the user account.

Modification of the user interface may include modification of a thread panel to show active threads having new replies. Alternatively or additionally, the one or more processors may be further configured to: receive an indication of user input associated with a given one of the plurality of threads; and in response to receiving the indication, modify the user interface to identify that the given thread is selectable. Alternatively or additionally, the one or more processors may be further configured to: determine whether there are any new threads corresponding to the electronic messaging application; and upon determination that there is at least one new thread, configure the user interface to present a follow indicator to alert the user of an option to follow the at least one new thread.

DETAILED DESCRIPTION

Overview

As discussed herein, various tools are provided for an electronic messaging application that enable a user to discover relevant new threads, as well as manage navigation between different threads. This includes providing a graphical user interface (GUI) that supports enhanced filtering for both user-specific identification (e.g., mentions) and threads of interest (e.g., followed messages or messages the user may elect to follow).

Figure 1A:
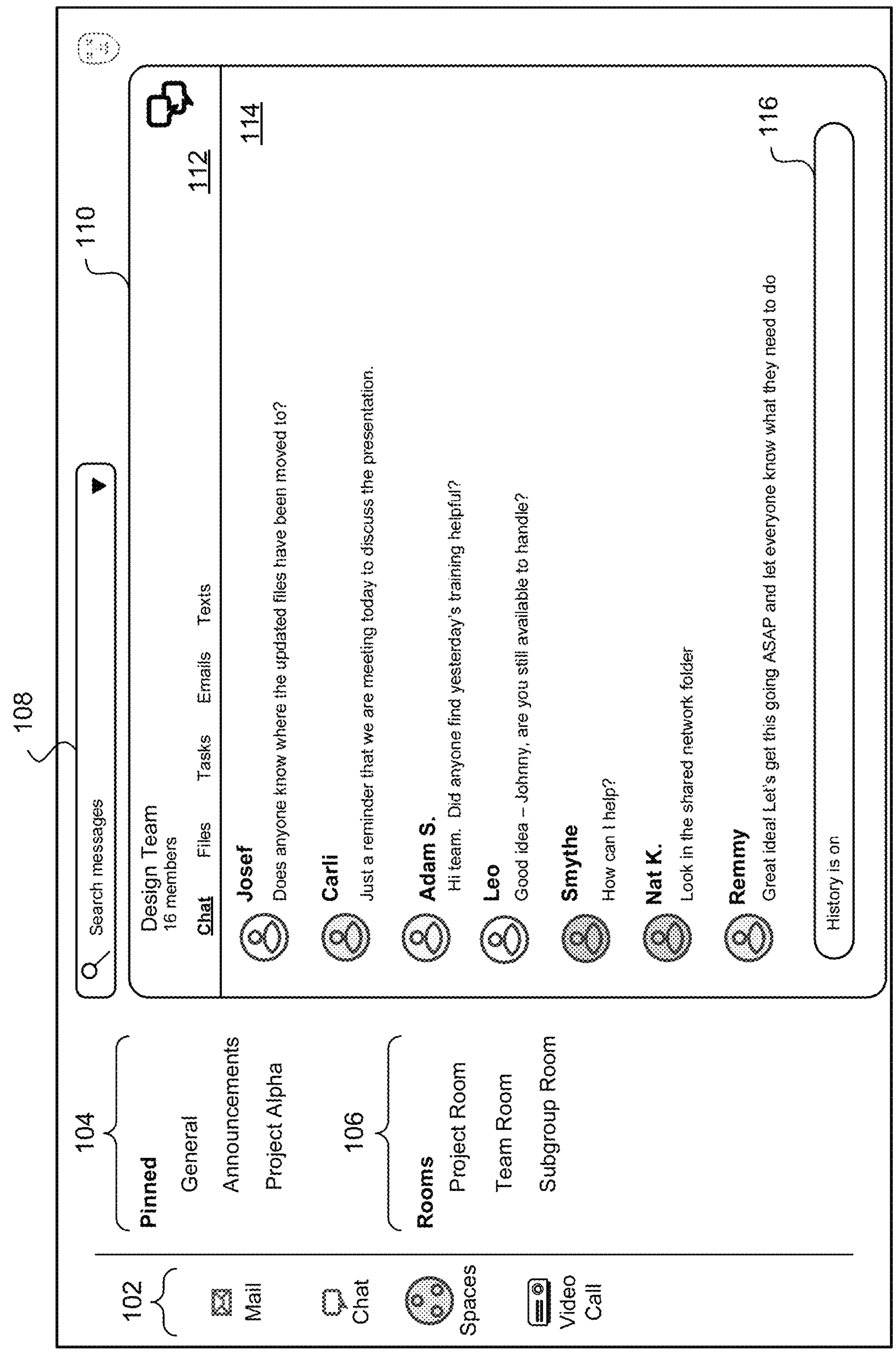
FIGS. 1A-B illustrates examples involving a user interface for threaded messages in accordance with aspects of the technology.

FIG. 1A illustrates features of an example electronic messaging application that supports threading. As shown in view 100 of FIG. 1A, a first area 102 of the user interface can include links to different messaging options, such as email, chat, breakout rooms or other spaces, and/or a video call (videoconference) as shown. Other messaging options may be provided in addition or alternatively to any of these, including text messaging or collaborative apps. Adjacent to area 102, the user interface may include other areas for presentation to the user, including a pinned area 104 for any links that should remain displayed on the GUI, as well as a rooms area 106, which (if used) would list specific rooms accessible to or chosen by the user. A search toolbar 108 may enable the user to search through one or more specific types of messages (e.g., emails, chats, or both emails and chats).

In this example, the user interface also includes area 110, which may present a list of chats, files, tasks or other content (e.g., emails or texts) to the user. Here, one section 112 of the area 110 allows for selection of the types of content to list, while another section 114 presents at least a subset of the listed content. A scroll bar or other tool may allow the user to see hidden parts of the list (e.g., if there are too many chats to display given the available display size). This section may also include a test field 116 that enables the user to type a new message and add it to the conversation.

Figure 1B:
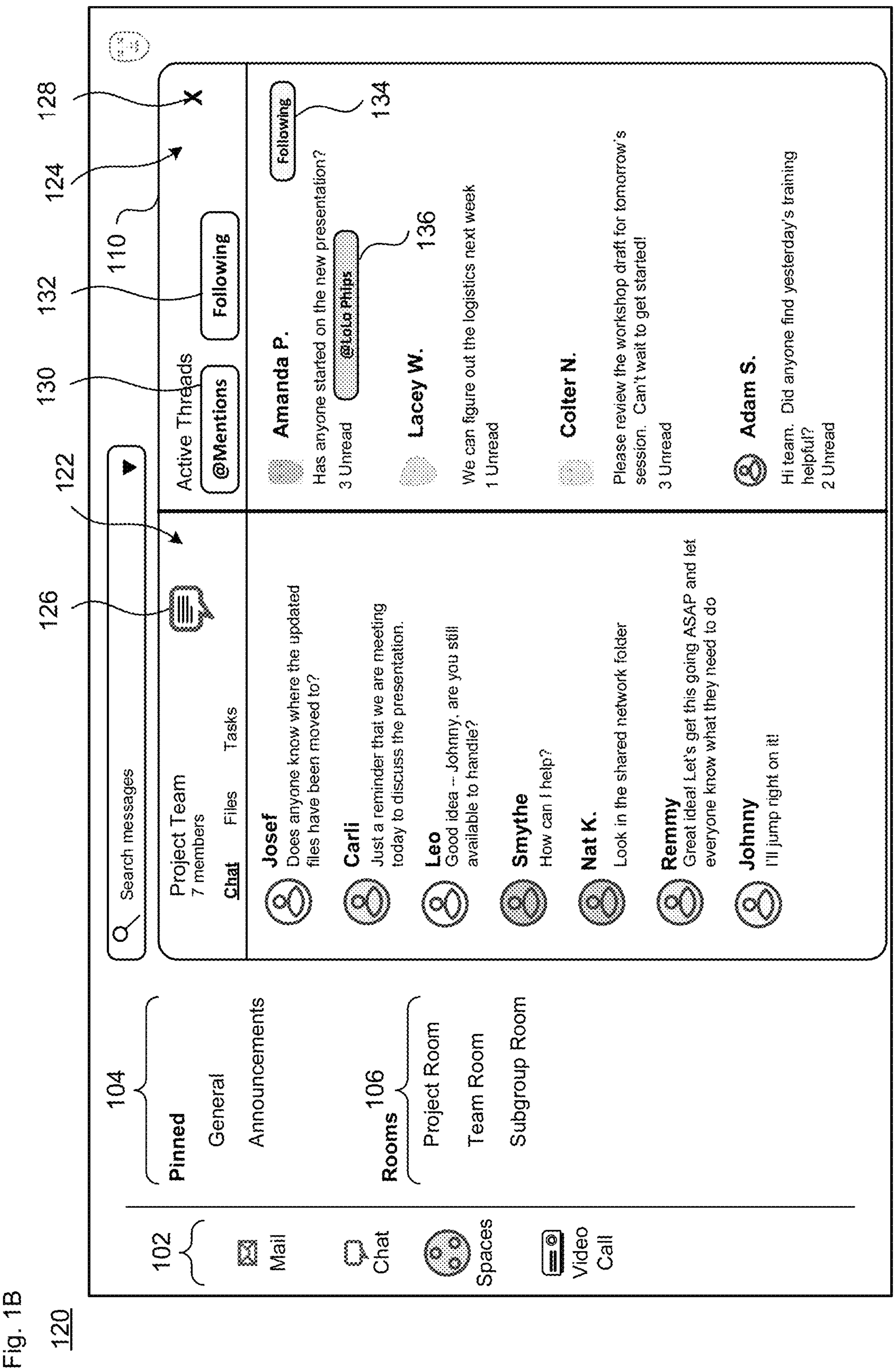

View 120 of FIG. 1B illustrates an example of the user interface when there are new replies to any thread that the user is involved in. As shown, there may be a "Spaces" link. Spaces provide a virtual location where users can share files or other content, assign tasks to specific users, stay connected to one another, etc. Area 110 in this view includes adjacent panels 122 and 124. Panel 122 can identify the members for a project team, for instance along with a most recent message from each member. Panel 124 is configured to show active threads associated with the user's account in the space. As shown, an icon 126 in this panel, e.g., a thread navigation icon, can be used to toggle the panel 124 open and closed. The panel 124 can also be closed via the icon (X) 128. Selection of icon 130 (e.g., a button or chip) is used to identify threads in which the user is mentioned, and selection of icon 132 is used to identify threads the user is following and/or receiving notification updates about. For instance, chip 134 can permanently be presented adjacent to another user's name (or avatar) to differentiate that a particular thread is being followed. Here, once the user selects a thread to follow, the system can generate a flag or store information that associates the user's account with that particular thread.

As illustrated in this example, each thread shows the avatar and name of the user who sent the original message the thread is based off of, timestamp of when the original message was sent, a maximum three-line snippet of the message. The information for each thread shows the timestamp of the latest reply and/or the number of replies or number of unread replies if any are unread. The information can also include an @mention chip for the user if they have an unread @mention in the replies.

Figure 2:
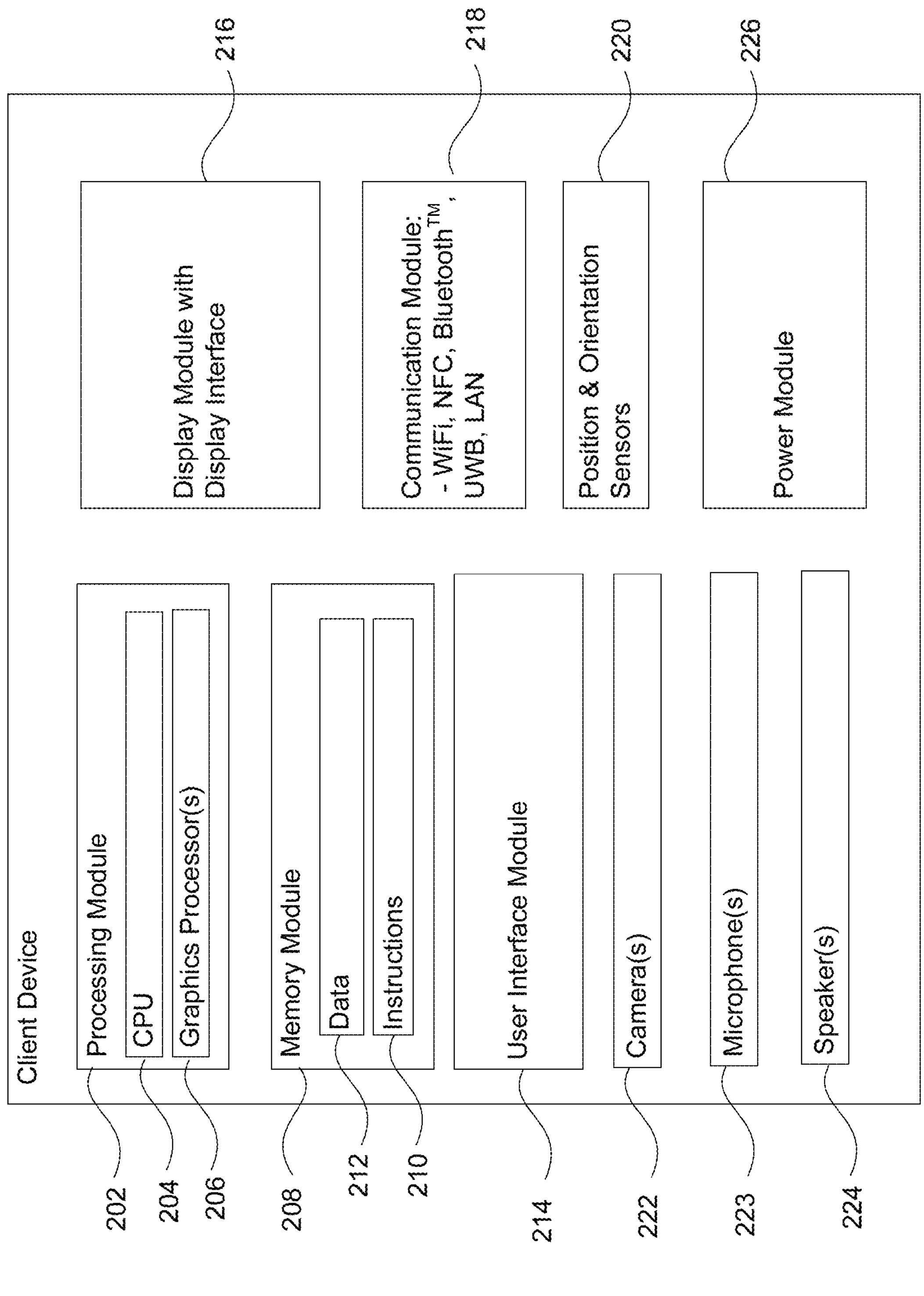
FIG. 2 illustrates a block diagram of an example client computing device for use with aspects of the technology.

FIG. 2 illustrates a block diagram of an example client computing device 200 that can be used with thread navigation for messaging applications. By way of example only, the client computing device can be a desktop computer, a laptop computer (e.g., a tablet or netbook PC), a mobile phone, an in-home device such as smart display, etc. As shown, the client device includes a processing module 202 having one or more computer processors such as a central processing unit 204 and/or graphics processors 206, as well as memory module 208 configured to store instructions 210 and data 212. The processors may or may not operate in parallel, and may include ASICs, controllers and other types of hardware circuitry. The processors are configured to receive information from a user through user interface module 214, and to present information to the user on a display device (or multiple display devices) of the display module 216 via the user interface module. For instance, when running an email or other messaging app, the user interface module may cause the display device to present a messaging screen having an active thread panel such as shown in FIG. 1B. The display module 216 has a display interface and may be configured as a touchscreen that enables user input via a stylus or other tool, or by the user physically touching the screen or using contactless gestures.

User interface module 214 is configured to receive user input. User interface module 214 may receive commands from a user via user inputs and convert them for submission to a given processor. The user interface module may link to a web browser (not shown). The user inputs may include a touchscreen as noted above, in addition to or alternatively from a keyboard, keypad, mousepad and/or touchpad, microphone, gesture-based input or other types of input devices. The keyboard, keypad, mousepad and/or touchpad may be part of or connectable to the base via a cable or other wired connection, or may physically separate from the integrated client device and configured to connect via one or more wireless connections such as Bluetooth™, WiFi, ultra-wideband (UWB), infrared, etc. The user interface module 214 can be operatively connected to the display module 216.

The display module 216 may comprise circuitry for driving the display device to present graphical and other information to the user. In other words, the display device is configured to present visual content. By way of example, the graphical information may be generated by the graphics processor(s) 206, while CPU 204 manages overall operation of the integrated client device 200. The graphical information may display responses to user queries on the display module 216. For instance, the processing module may run a browser application or other service (e.g., a, email, text messaging or chat app) using instructions and data stored in memory module 208, and present information associated with the browser application or other service to the user via the display module 216. The memory module may include a database or other storage for browser information, message thread information, etc.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively, the memory module 208 may also include removable media (e.g., DVD, CD-ROM or USB thumb drive). One or more regions of the memory module 208 may be write-capable while other regions may comprise read-only (or otherwise write-protected) memories. In one implementation, a computer program product is tangibly embodied in an information carrier. Although FIG. 2 functionally illustrates the processor(s), memory module, and other elements of integrated client device as being within the same overall block, such components may or may not be stored within the same physical housing. For example, some or all of the instructions and data may be stored on an information carrier that is a removable storage medium connectable to the base or the display housing (e.g., optical drive, high-density tape drive or USB drive) and others stored within a read-only computer chip which is integrated into the base or the display housing.

The data 212 may be retrieved, stored or modified by the processors in accordance with the instructions 210. For instance, the data may be stored in computing device registers, in a relational database as a table having a plurality of different fields and records, XML documents or flat files. The data may also be formatted in any computing device-readable format.

The instructions 210 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance.

As also shown in FIG. 2, the client computing device 200 includes a communication module 218 for communicating with other devices and systems, including other client devices, servers and databases. The communication module 218 includes a wireless transceiver; alternatively, the module may alternatively or additionally include a wired transceiver. The integrated client device 200 may communicate with other remote devices via the communication module 218 using various configurations and protocols, including short range communication protocols such as near-field communication (NFC), Bluetooth™, Bluetooth™ Low Energy (BLE), UWB or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the example device as shown includes one or more position and orientation sensors 220. The position and orientation sensors 220 are configured to determine the position and orientation of one or more parts of the client computing device 200. For example, these components may include a GPS receiver to estimate the device's location (e.g., latitude, longitude and/or altitude), as well as an accelerometer, gyroscope or another direction/speed detection device such as an inertial measurement unit (IMU) capable of determining the orientation of the device. The client computing device 200 may also include one or more camera(s) 222 for capturing still images and recording video streams such as an integrated webcam. The device may also include one or more microphones 223, speakers 224, as well as a power module 226. Actuators to provide tactile feedback or other information to the user may be incorporated into the touchscreen of the display module (not shown).

Figure 3:
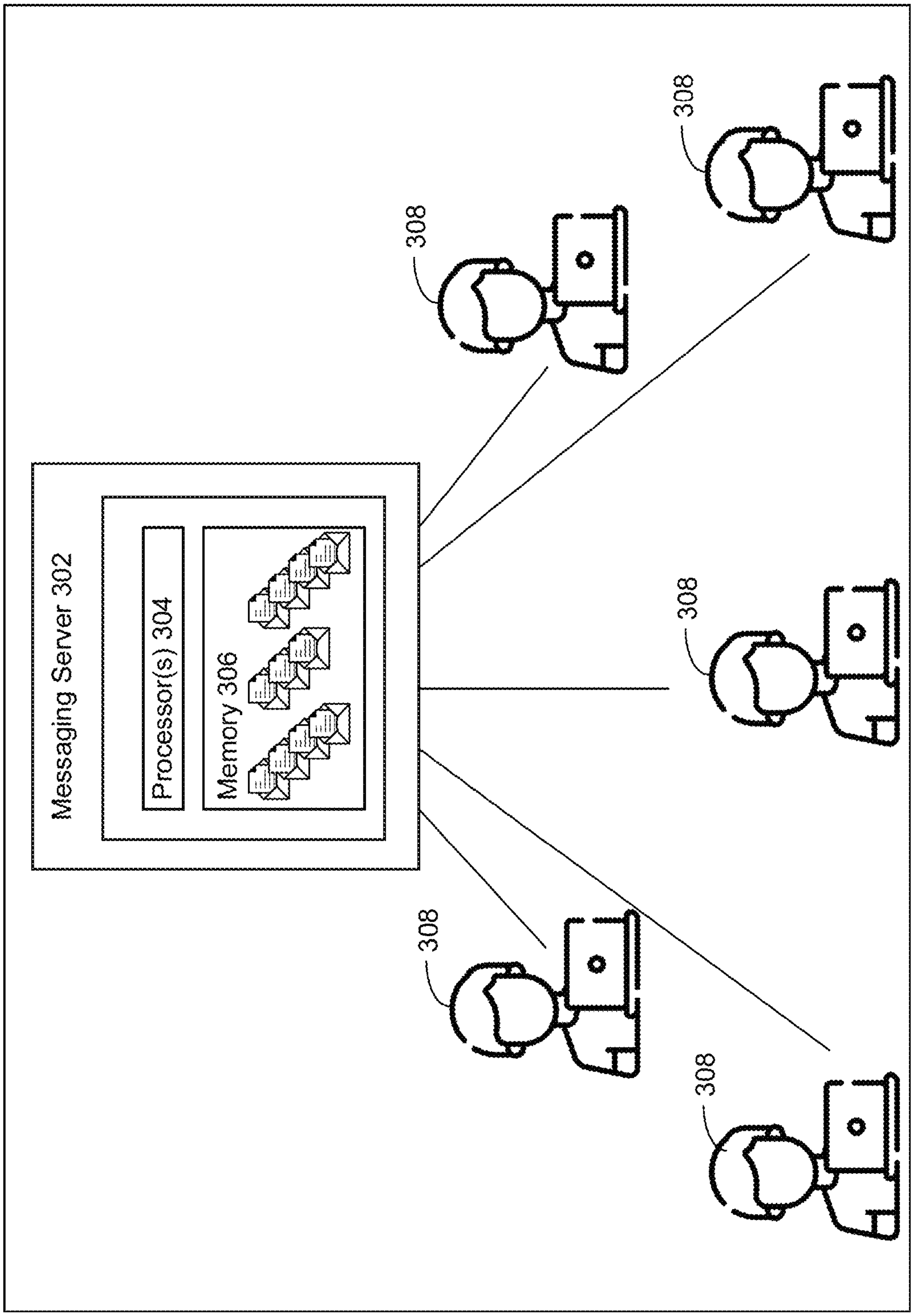
FIG. 3 illustrates an example messaging system in accordance with aspects of the technology.

FIG. 3 illustrates an example system 300 for messaging in accordance with aspects of the technology. The system includes a messaging server 302 having one or more processors 304 and memory 306. The messaging server 302 may be a cloud-based server in which the processors 304 and memory 306 may be distributed across different computing devices or systems (e.g., a server farm). The messaging server 302 is configured to support at least one messaging app, for instance operating as an email server, text messaging server, chat server, etc. Various users 308 are able to communicate with one another through the messaging app supported by the server 302.

Example Scenarios and Applications

Aspects of the technology enable a user to focus on relevant threads, such as specific threads in a chat room or other messaging space instead of across an entire organization. Here, the user is able to view all of the threads associated with that room/space, not just the threads they are following. In this way the system allows for identification and participation in relevant conversations by the user in an efficient manner.

Figure 4A:
FIGS. 4A-C illustrate a graphical interface for thread navigation in accordance with aspects of the technology.
Figure 4B:
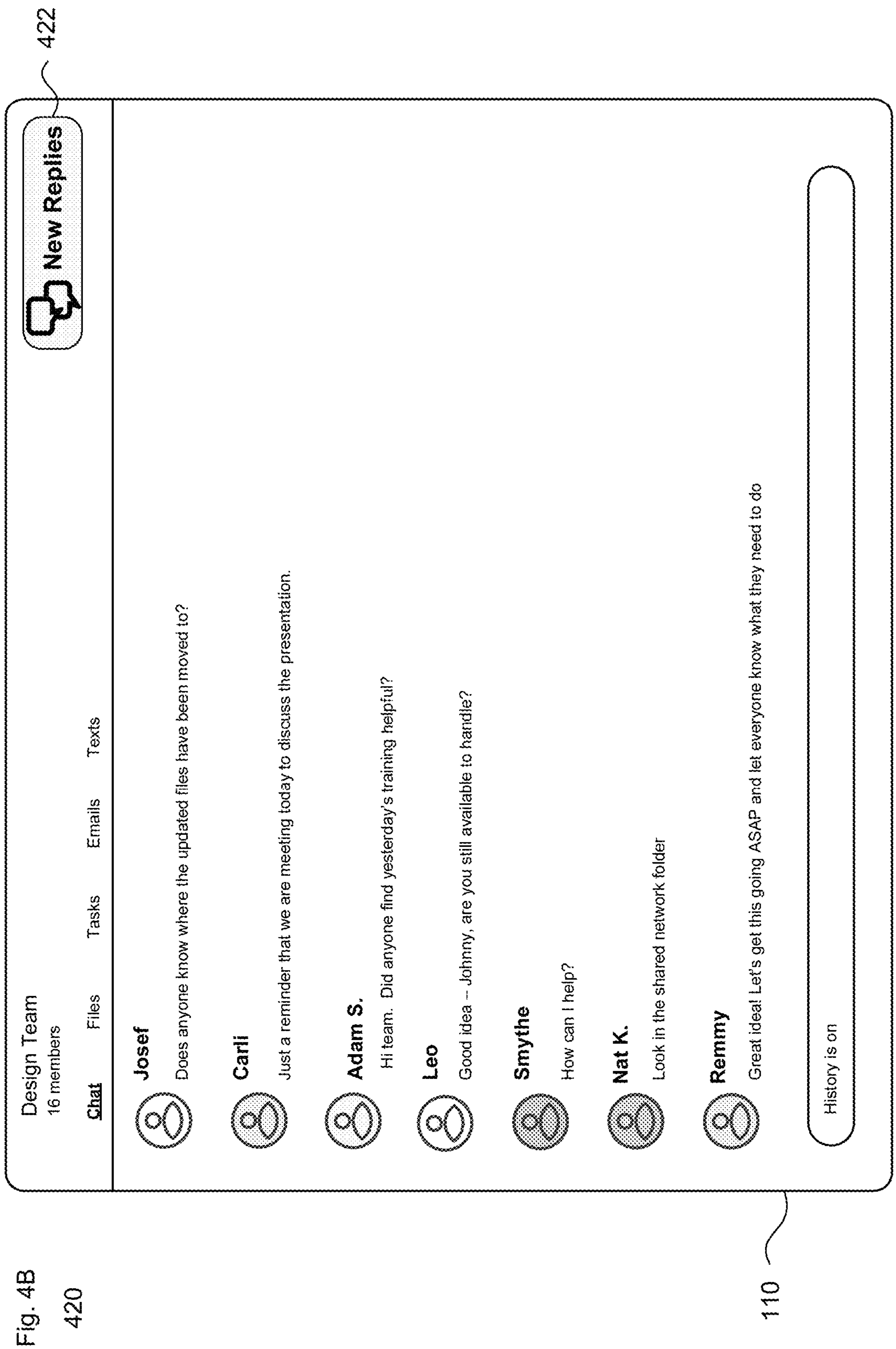

View 400 of FIG. 4A shows area 110 of the GUI from FIG. 1A. As noted above, this area includes one section 112 that allows for selection of the types of content to list (e.g., chats, emails, texts, etc.), while another section 114 presents at least a subset of a selected type of content. Thread navigation icon 402 can be used to toggle a thread navigation panel open and closed. Here, if the system determines that there are no new replies, then the thread navigation icon 402 remains in a base state that enables toggling. However, when the system determines there are new replies to any thread in the space, the thread navigation icon 402 is modified in the display to alert the user. This can be done by changing color, getting a colored or shaded background, and/or animating to display the phrase "new replies". For instance, as shown in view 420 of FIG. 4B, the thread navigation icon has morphed into a modified thread navigation icon 422 that includes the text "New Replies" in a shaded box. The system may flag the last time the panel was opened and use that information to check to see whether any new replies were left since the last time the user opened the panel. Upon a determination that at least one new reply has been left to any thread associated with the user's account, the modified icon can be presented. In one example, the system may only check on thread replies. In this case, there would be no modified icon if there are new messages in the main conversation, only if there are new replies to threads since the last time the user opened the panel.

Figure 4C:
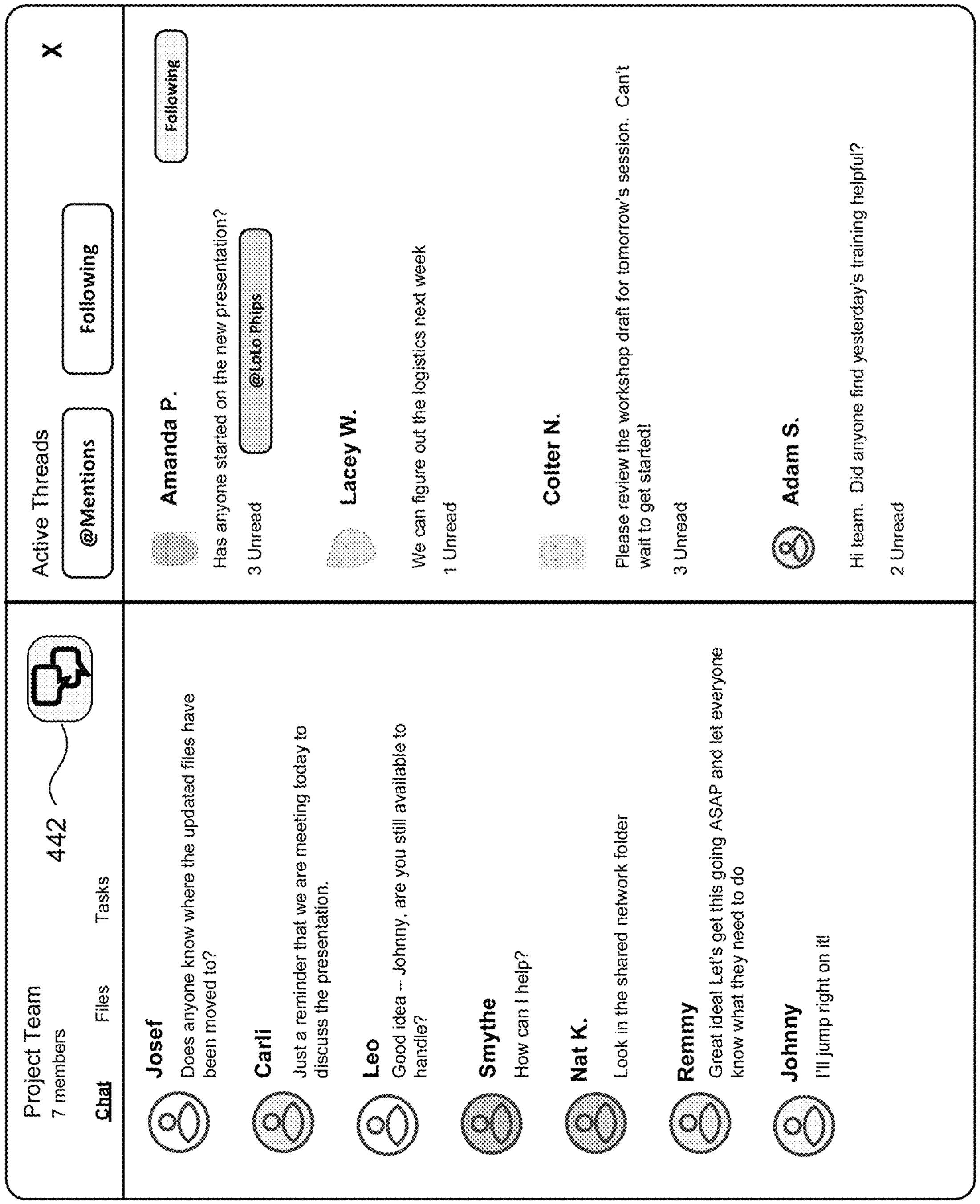

Upon the system determining that the user has selected the thread navigation icon, the GUI splits the thread area into adjacent panels (e.g., panels 122 and 124 of FIG. 1B). View 440 of FIG. 4C illustrates an example of the adjacent panels. In this example, the left panel identifies the members for a project team and recent messaging information, e.g., a most recent message from each member. Here, the right panel is configured to show active threads associated with the user's account. When transitioning to view 440 from view 420, the GUI may just split the area into the 2 adjacent panels or may employ an animation that causes the panel shown in view 420 to shrink while the new active threads panel expands. Upon presenting the two adjacent panels, the thread navigation icon may revert to its initial state as shown at 442. Here, selection of the icon when both panels are presented may cause the new active threads panel to collapse or otherwise close. Thus, the user can easily toggle the GUI to show or hide (or minimize) active threads.

In an alternative, the system may automatically open the new active threads panel when the user opens a space or otherwise accesses the messaging application. Here, the system may, without user input, open the active threads panel, perform a filter operation to identify any active threads the user is following, and select those threads for presentation in the panel.

Figure 5:
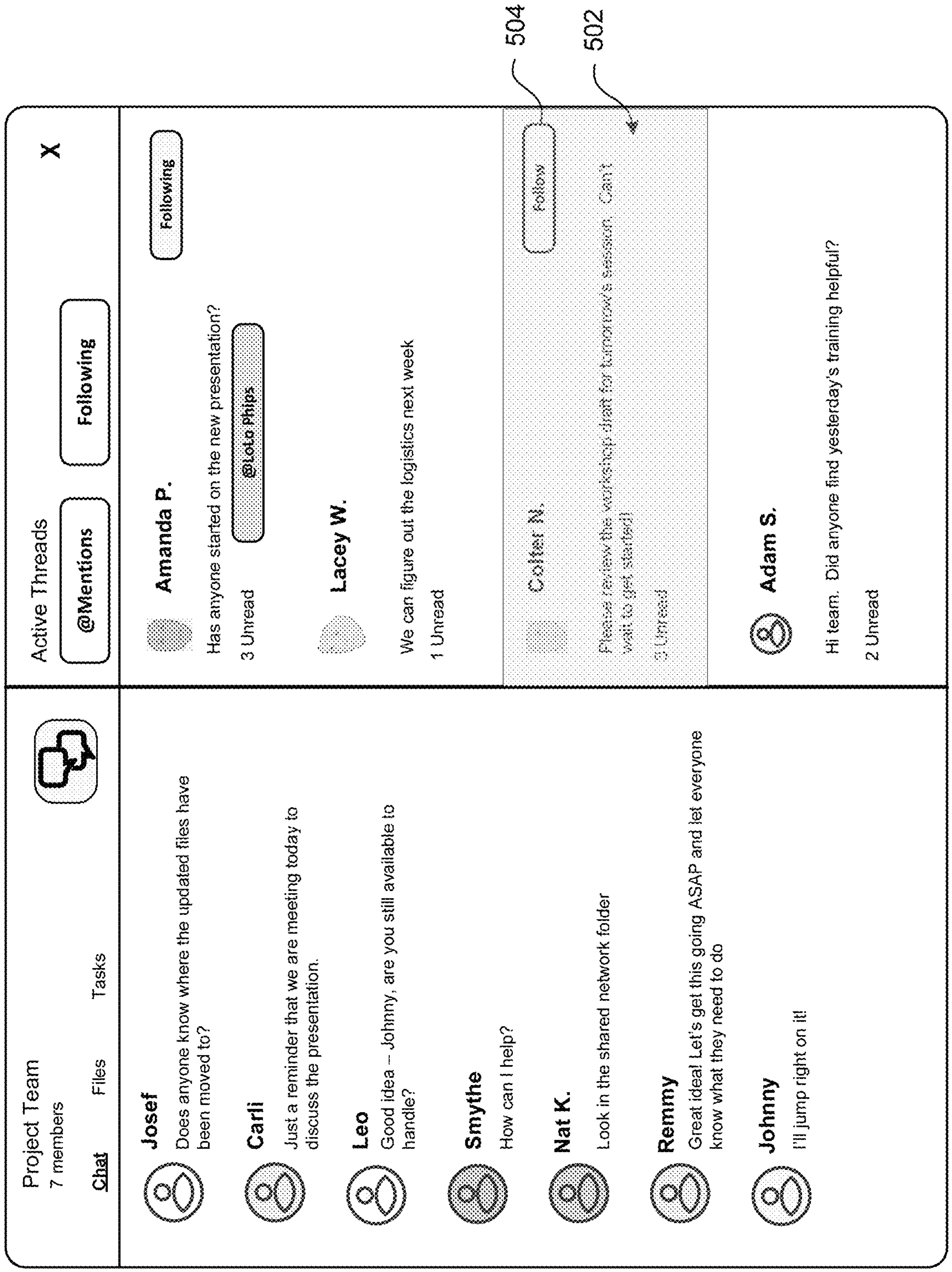
FIG. 5 illustrates example of an active threads panel in accordance with aspects of the technology.

View 500 of FIG. 5 illustrates a scenario where the active threads panel is presented. Here, when the user causes a mouse pointer or other UI tool to "hover" over a particular thread, that thread may be highlighted as shown by shaded background 502. This shading or other highlighting indicates that that particular thread is selectable by the user. In addition, for threads that are not currently being followed by the user's account, a "follow" chip 504 may appear in the highlighted area to indicate that the user may elect to follow that thread. In one example, upon detecting hovering, the system would generate a card that shows a summary of the discussion in the thread since the user last visited along with a snippet of the latest reply (e.g., up to 1-3 lines from the latest reply).

Figure 6:
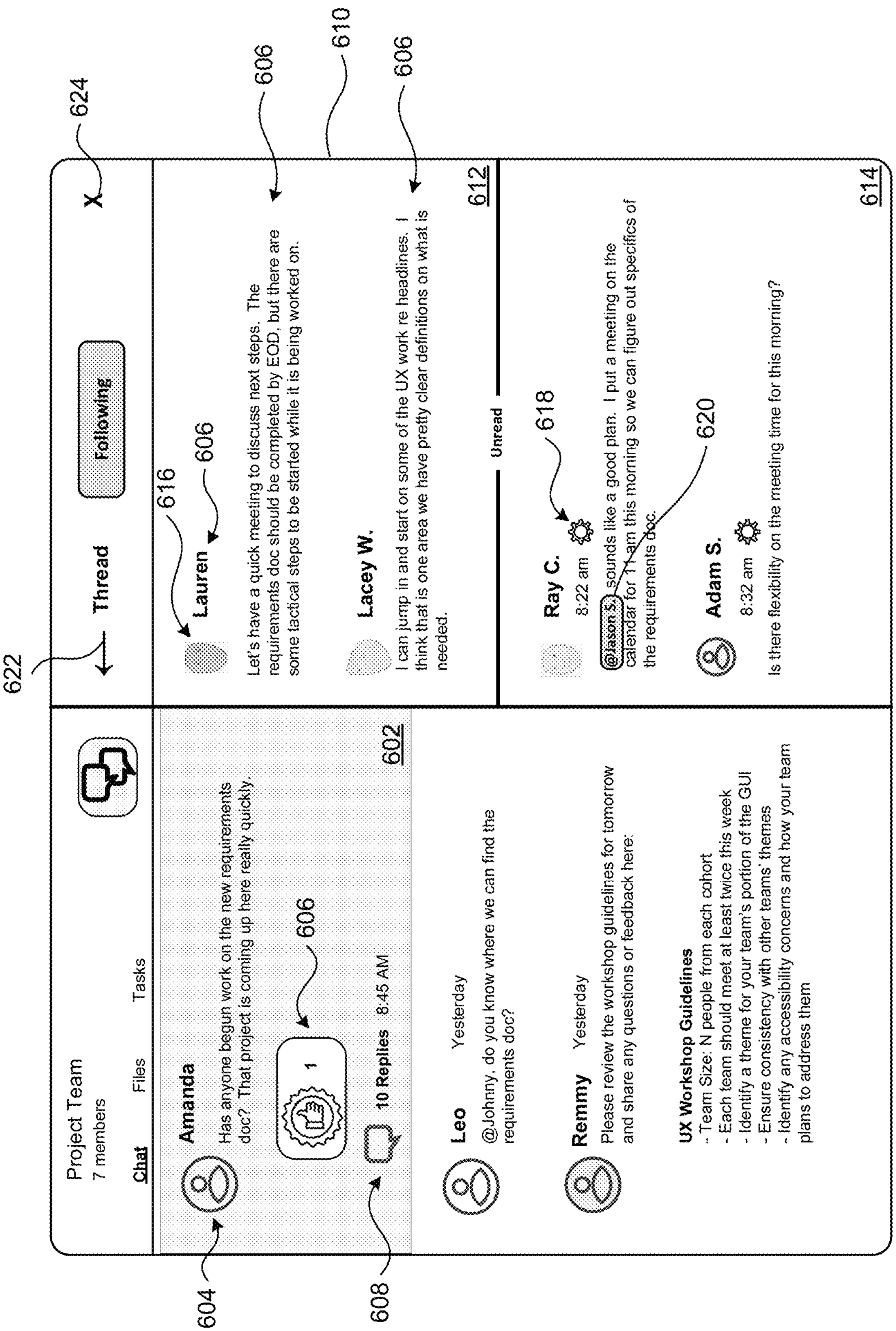
FIG. 6 illustrates an example of an open thread scenario in accordance with aspects of the technology.

View 600 of FIG. 6 illustrates an open thread scenario. Here, once the active threads panel is presented in the GUI, a subset of members for a project team and their most recent messages is displayed in one (here, the left) panel. Shaded area 602 indicates that a message has been selected. The threads in this panel may include a user's name and an avatar 604 of the original user that spawned the thread, a timestamp of the original message in the thread, a number of message likes 606, and an indicator showing a number of replies 608 (which can be, e.g., total replies or unread replies). For a given thread, a message snippet can be included of, by way of example only, up to 3 lines of the message. The number of lines may depend on the display size or type, the number of other threads to be presented, etc.

The adjacent (here, the right) panel 610 includes a thread of other messages associated with the selected message. In this example some messages in the thread have already been read by the user are in one (e.g., an upper) section 612 of this panel while unread messages in the thread are in another (e.g., a lower) section 614. Here, each message in the thread may be presented with the avatar 616 and name of the corresponding user. Messages may include a message snippet with the same number (or more or fewer) of lines as in the other panel. Read messages may include the time of the message. The unread message section may include an identifier showing how many messages are unread. Alternatively or additionally, unread messages may include an icon 618 to indicate that they have not yet been read. In one example, if all messaged in the thread have been read, the panel 610 may show the total number of thread replies (which may be highlighted, shaded or in a different color from other text). The unread messages also include timestamps for when those messages were posted. If a user was @mentioned, there is a chip 620 to indicate that. The user may close the panel for the thread being displayed by clicking either arrow 622 or the X icon 624.

In one scenario, when the message panel is opened for a particular room, the panel shows the users N threads in that room with the latest comments, which may be sorted chronologically by latest reply. Here, N could be 5, 10, 20, 40 or more or less. The user can scroll through the threads identifying which threads they follow, have unread replies, or are mentioned in. The GUI enables the user to filter the threads to more easily find threads that they are mentioned in or are following.

Figure 7A:
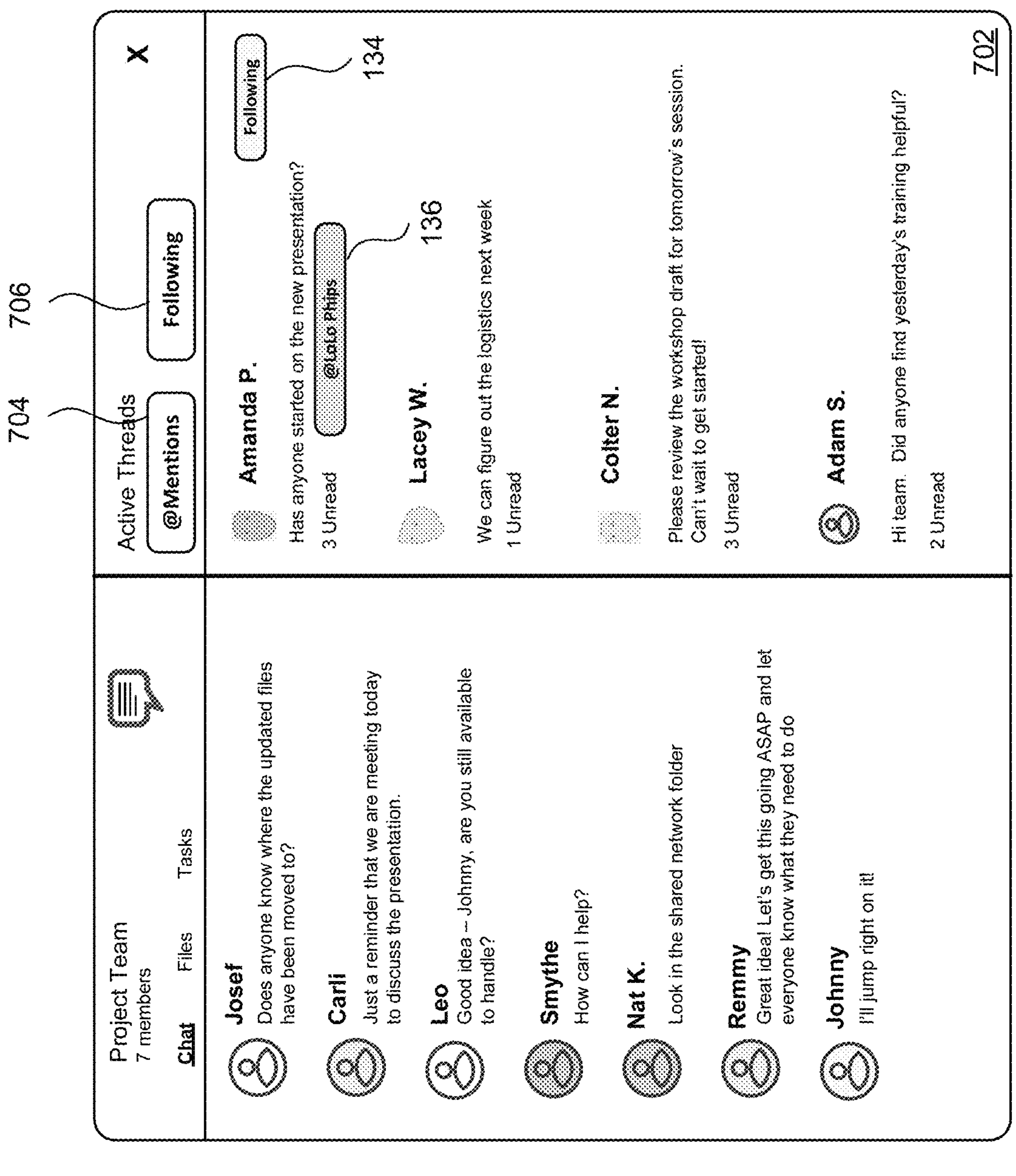
FIGS. 7A-C illustrate filtering examples in accordance with aspects of the technology.
Figure 7B:
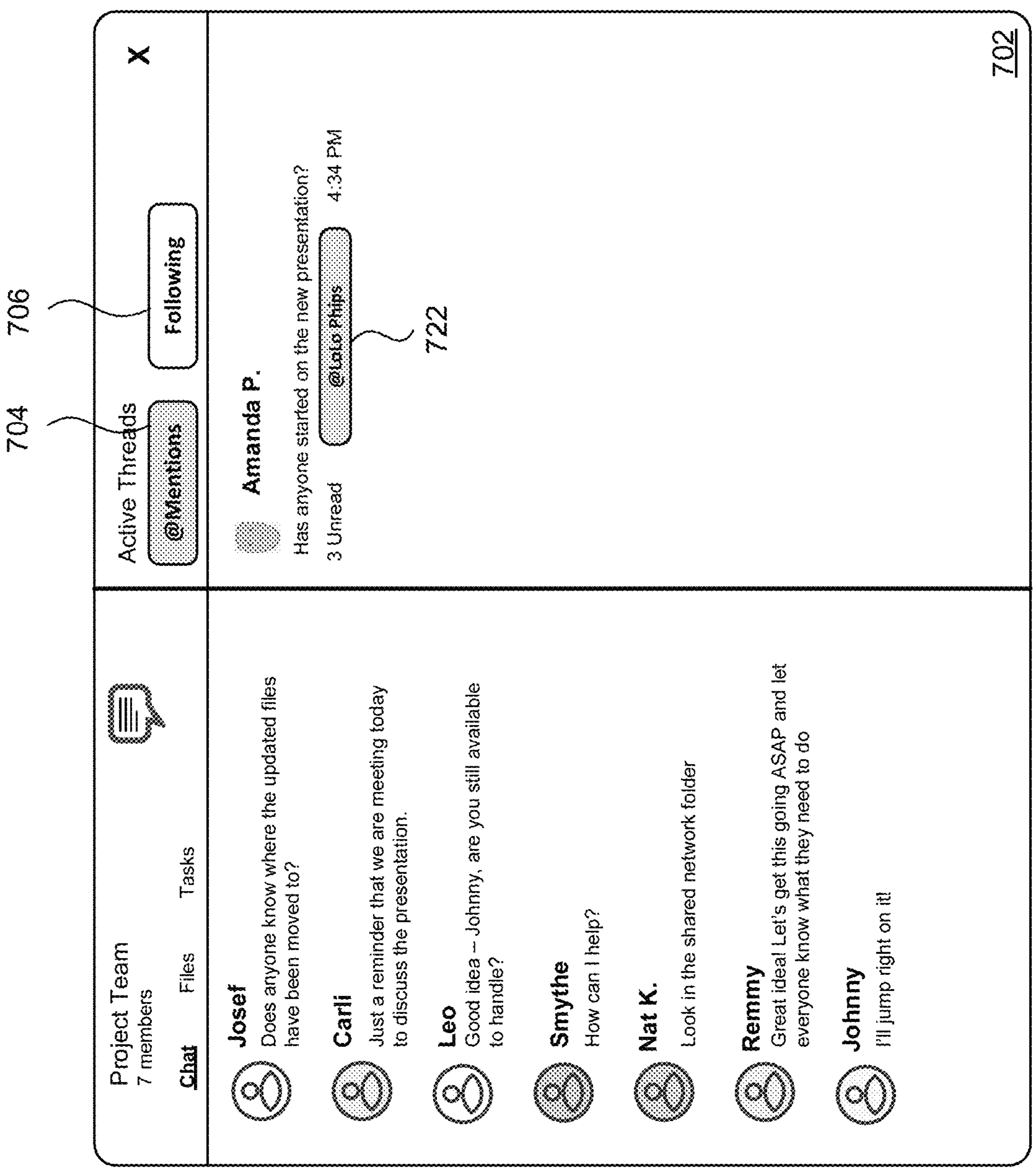

View 700 of FIG. 7A shows that active thread panel 702 may include one or more filter icons, such as an icon 704 to filter messages based on whether the user has been mentioned in any given message (e.g., an "@mention"), or an icon 706 to filter messages based on whether the user is following a particular thread. View 720 of FIG. 7B illustrates how the displayed messages change upon receipt of a user selection of @mentions icon 704. Here, a message in which the user is mentioned is displayed, and badge 722 or another indicia is added to the portion of the display panel with that message. In one scenario, when the @mention filter is selected, the system will select threads with unread @mentions for presentation from the preloaded N threads with the latest replies. The @mentions icon 704 may also be emphasized via shading, highlighting, flashing on/off or other graphical indicia. If the display is a touchscreen with haptic feedback, selection of the @mentions icon 704 may be accompanied by a selected haptic feedback sensation associated with mentions.

Figure 7C:
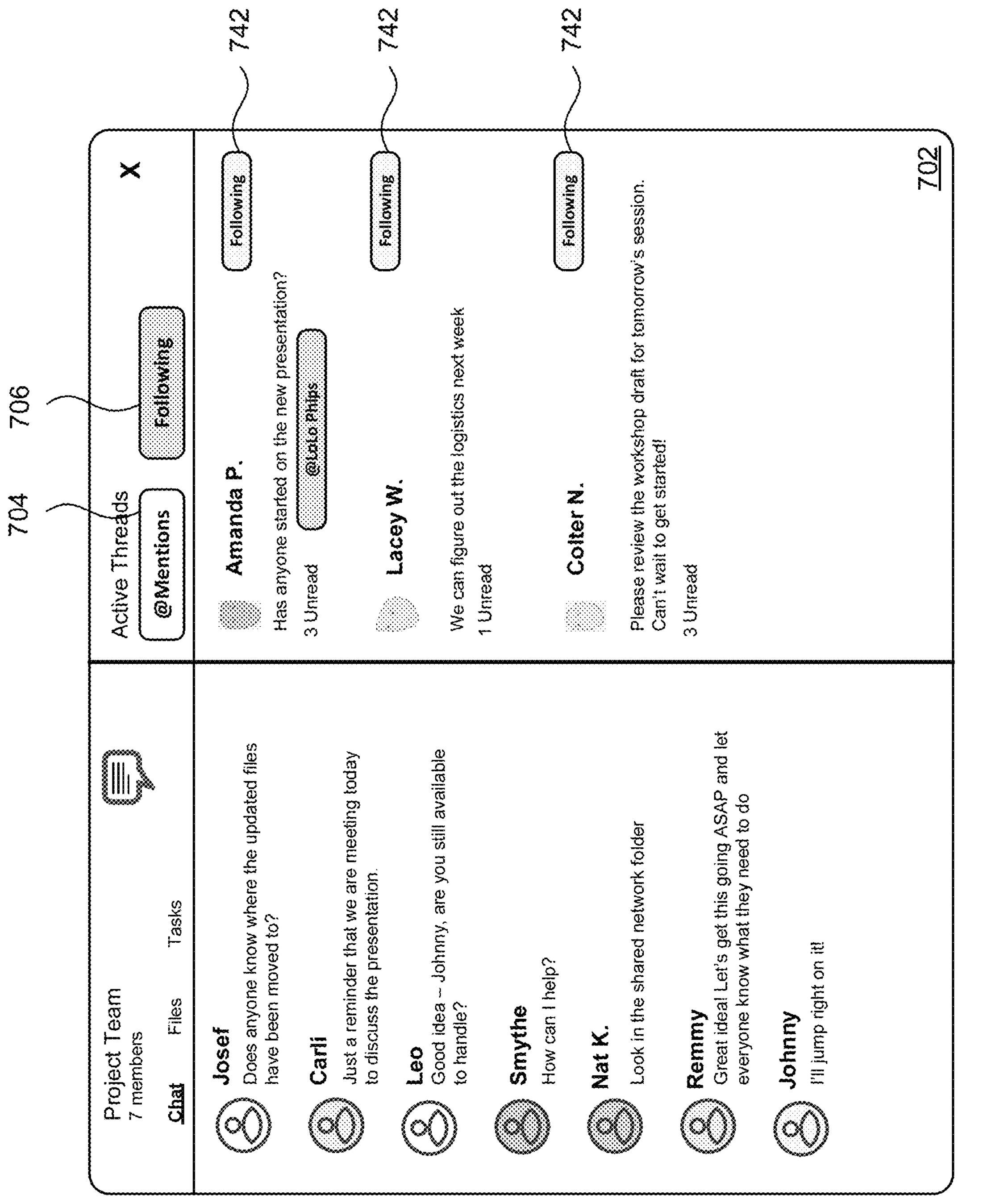

View 740 of FIG. 7C illustrates how the displayed messages change upon receipt of a user selection of the following icon 706. Here, messages that the user is following are displayed, and badge 742 or another indicia is added to the portion of the display panel with each corresponding message. In one scenario, when the following filter is selected the user will be shown all the threads they are following from the preloaded N threads with latest replies. This may be regardless of whether those threads have unread replies or not.

According to one scenario, only one filter may be selected at a time. However, in another scenario each filter may be concurrently selectable.

Example Communication Network

Figure 8A:
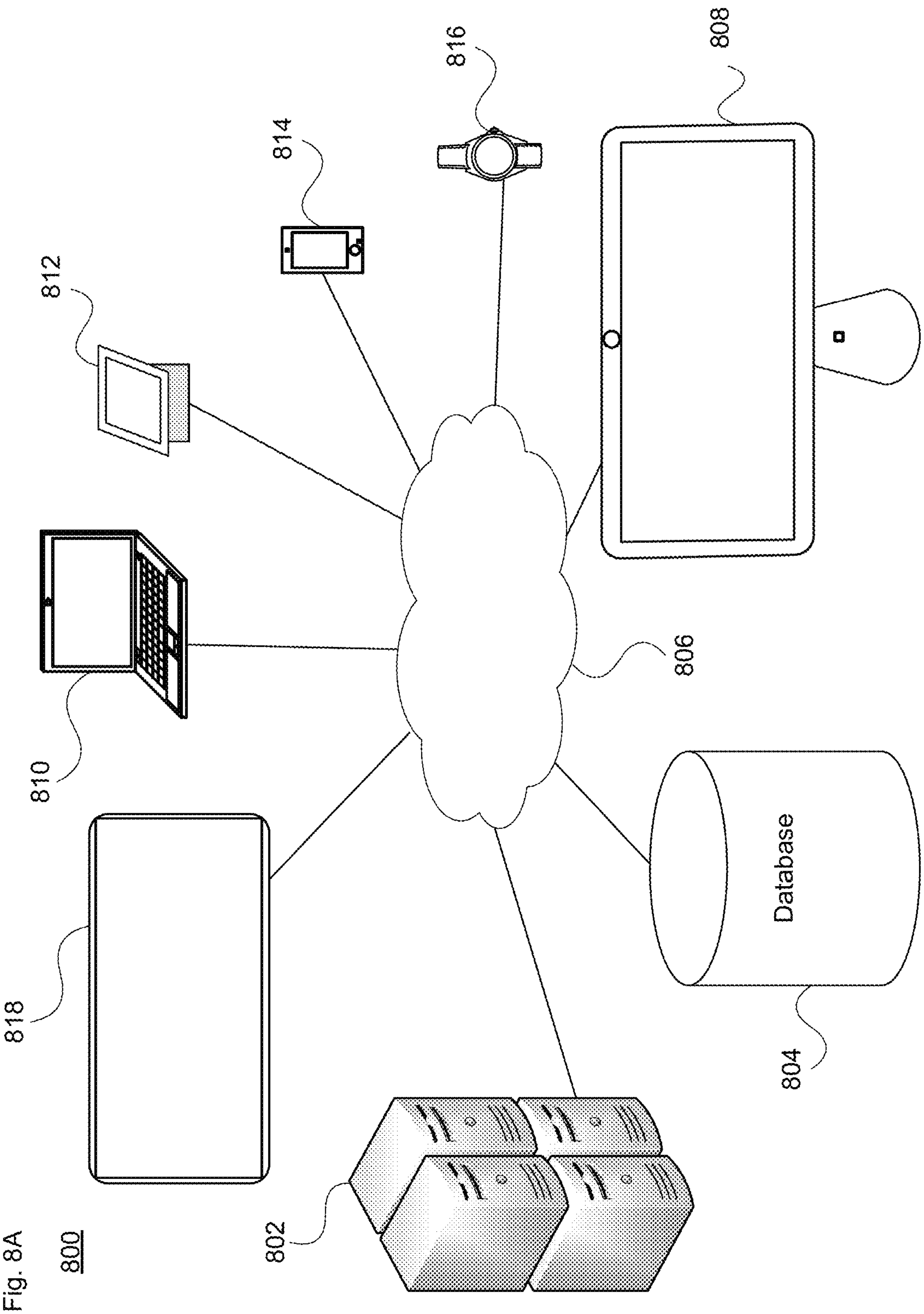
FIGS. 8A-B illustrate a communication system for use with aspects of the technology.
Figure 8B:
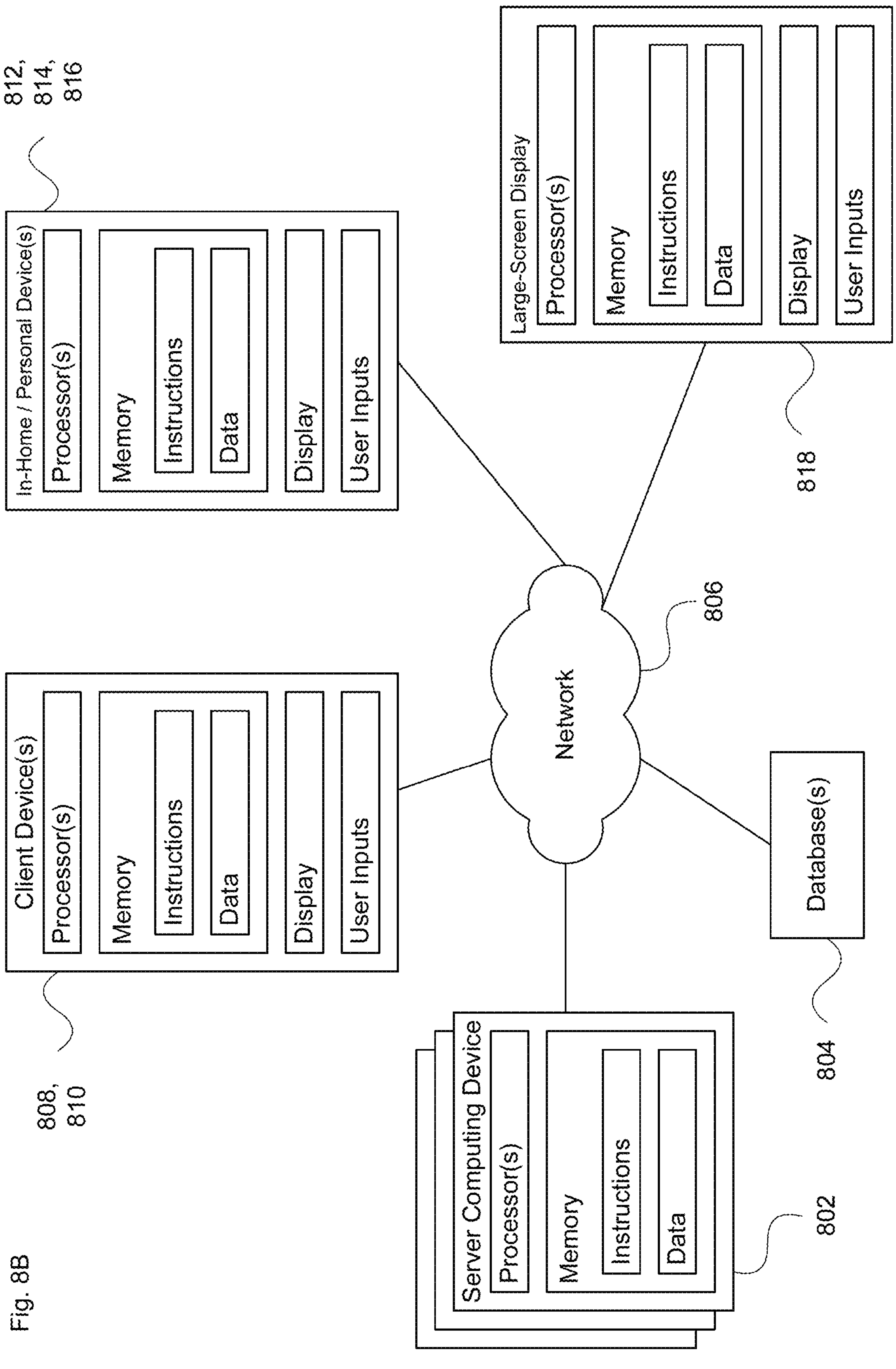

As noted above, messages from a user's client computing device may be communicated to other users' devices as part of a threaded communication arrangement, such as to provide comments about a common topic (e.g., a work project, after-school activities, social events, etc. One example computing architecture to support this is shown in FIGS. 8A and 8B. In particular, FIGS. 8A and 8B are pictorial and functional diagrams, respectively, of an example system 800 that includes a plurality of computing devices and databases connected via a network. For instance, computing device(s) 802 may be a cloud-based server system that provides or otherwise supports one or more messaging apps or other programs utilized by a client computing device. Database 804 may store messaging app data, user profile information, and/or other information. The server system may access the databases via network 806. Client devices may include one or more of a desktop-type integrated client computer 808, a laptop or tablet PC 810 and in-home devices such as smart display 812. Other client devices may include a personal communication device such as a mobile phone or PDA 814 or a wearable device 816 such as a smartwatch or head-mounted display (e.g., a virtual reality headset), etc. Another example client device is a large screen display such as a high-definition wall-mountable television 818, such as might be used in a living room or den during family gatherings.

In one example, computing device 802 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 802 may include one or more server computing devices supporting a messaging app (e.g., an email exchange server, chat app, texting app, etc.) that are capable of communicating with any of the computing devices 808-818 via the network 806.

As shown in FIG. 8B, each of the computing devices 802 and 808-818 may include one or more processors, memory, data and instructions. The memory stores information accessible by the one or more processors, including instructions and data that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs. Alternatively, each processor may be a dedicated device such as an ASIC, graphics processing unit (GPU), tensor processing unit (TPU) or other hardware-based processor. Although FIG. 8B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 802. Accordingly, references to a processor or computing device will be understood to include references to a collection of processors or computing devices or memories that may or may not operate in parallel.

The computing devices may include all of the components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices that is operable to display information (e.g., text, imagery and/or other graphical elements). Other output devices, such as speaker(s) may also provide information to users.

The user-related computing devices (e.g., 808-818) may communicate with a back-end computing system (e.g., server 802) via one or more networks, such as network 806. The user-related computing devices may also communicate with one another without also communicating with a back-end computing system. The network 806, and intervening nodes, may include various configurations such as a local in-home network, and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Exemplary Method of Operation

Figure 9A:
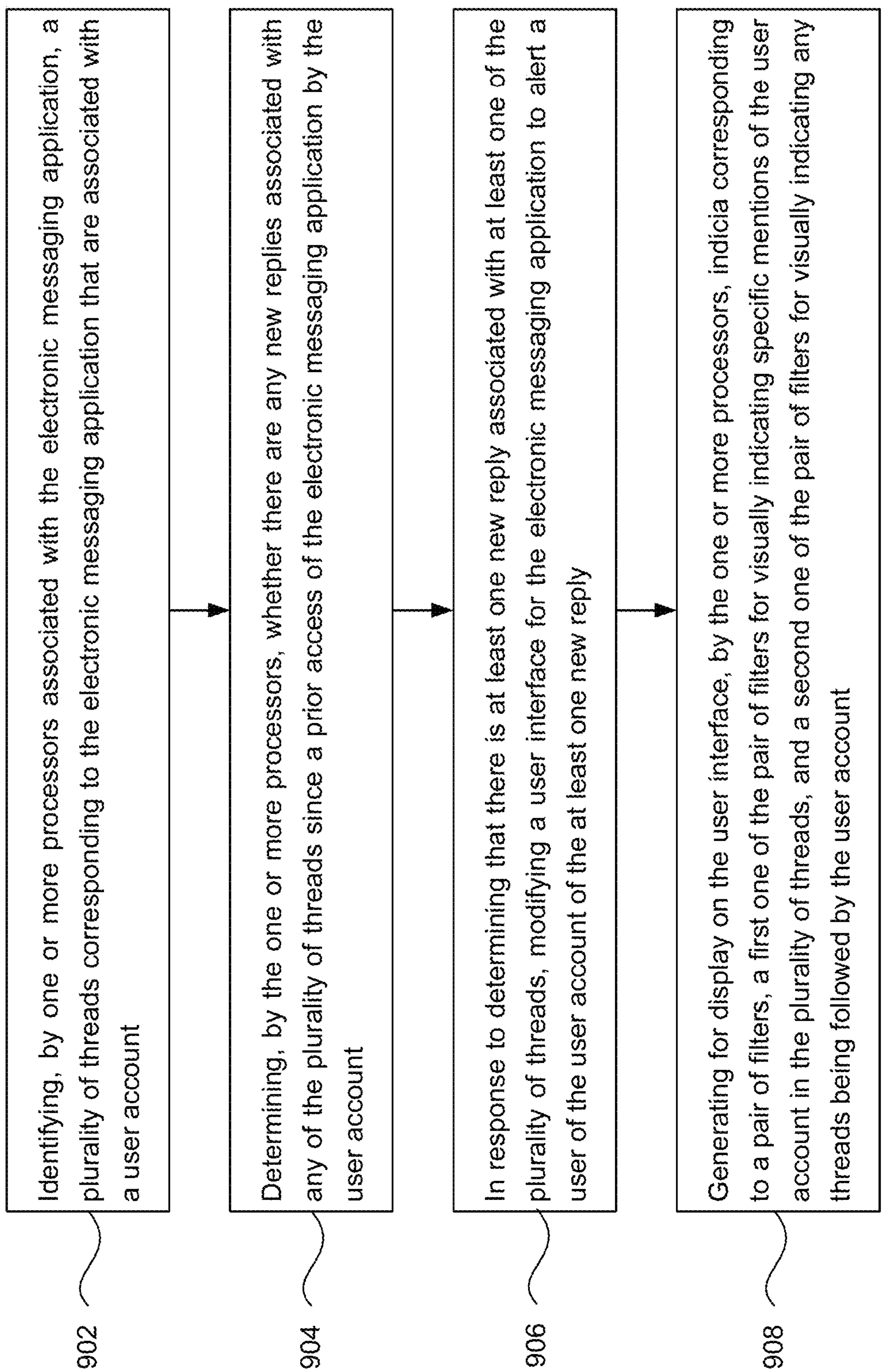
FIGS. 9A-E illustrate a method and variations thereof in accordance with aspects of the technology.

FIG. 9A illustrates a method 900 for managing threads in an electronic messaging application. At block 902, one or more processors associated with the electronic messaging application are configured to identify a plurality of threads corresponding to the electronic messaging application that are associated with a user account. At block 904, the processors determine whether there are any new replies associated with any of the plurality of threads since a prior access of the electronic messaging application by the user account. At block 906, in response to the determination that there is at least one new reply associated with at least one of the plurality of threads, the method includes modifying a user interface for the electronic messaging application to alert a user of the user account of the at least one new reply. And at block 908, the method further includes generating, for display on the user interface indicia corresponding to a pair of filters. A first one of the pair of filters is for visually indicating specific mentions of the user account in the plurality of threads (e.g., @mentions). A second one of the pair of filters is for visually indicating any threads being followed by the user account.

Figure 9B:
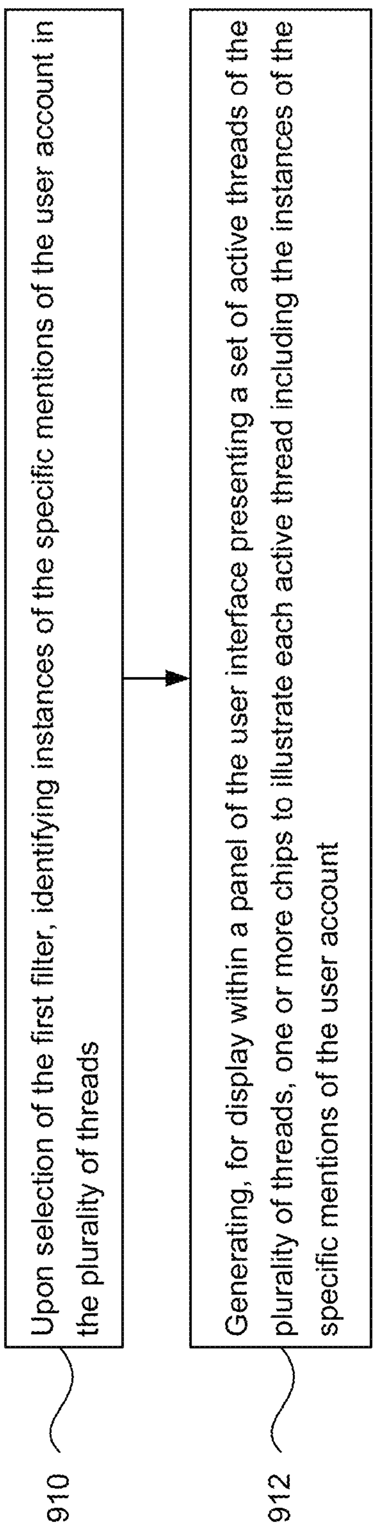
Figure 9C:
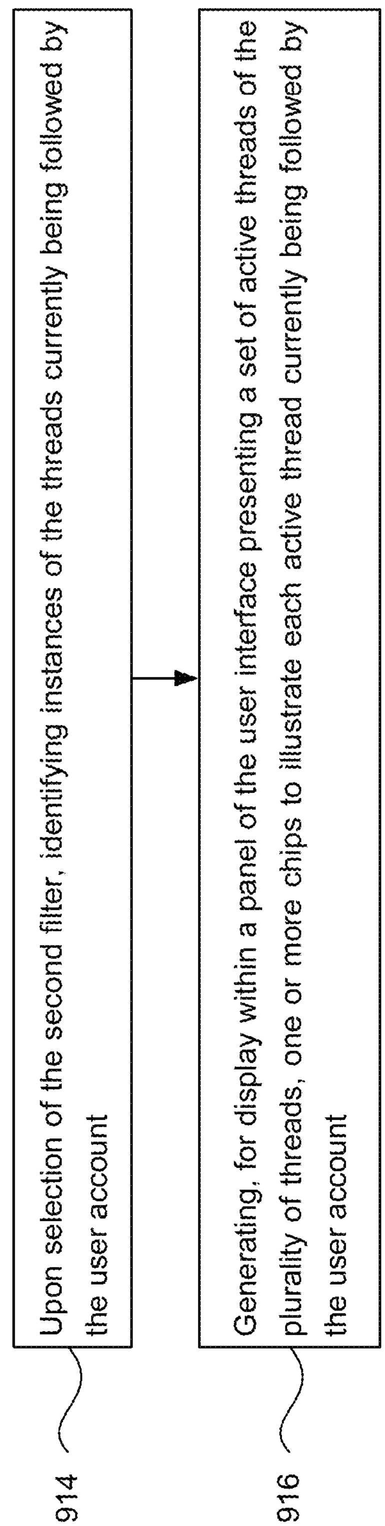

FIG. 9B illustrates that upon selection of the first filter, at block 910 the method may further include identifying instances of the specific mentions of the user account in the plurality of threads. Then, at block 912, the method would also include generating, for display within a panel of the user interface presenting a set of active threads of the plurality of threads, one or more chips to illustrate each active thread including the instances of the specific mentions of the user account. FIG. 9C illustrates that upon selection of the second filter, at block 914, the method would also include identifying instances of the threads currently being followed by the user account. Then, at block 916, the method would also include generating, for display within a panel of the user interface presenting a set of active threads of the plurality of threads, one or more chips to illustrate each active thread currently being followed by the user account.

Figure 9D:
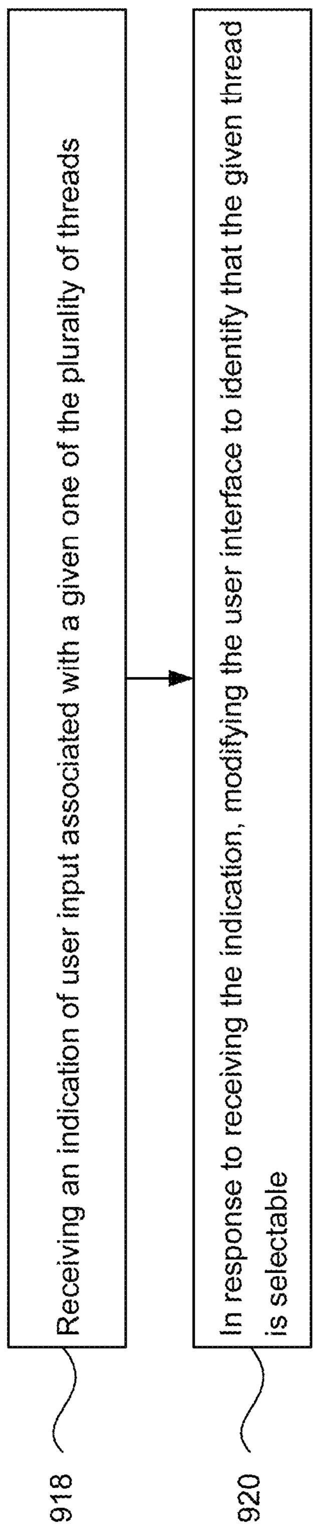
Figure 9E:
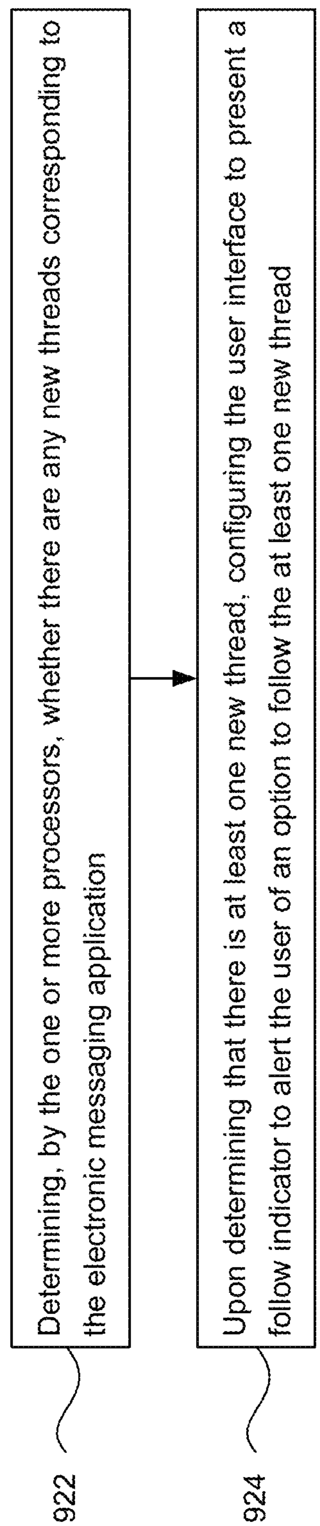

FIG. 9D illustrates a variation of the method 900. Here, at block 918, the method includes receiving an indication of user input associated with a given one of the plurality of threads. Then, at block 920, in response to receiving the indication, the method would include modifying the user interface to identify that the given thread is selectable. And FIG. 9E illustrates another variation of the method. This includes, at block 922, determining whether there are any new threads corresponding to the electronic messaging application. At block 922, upon determining that there is at least one new thread, the method would include configuring the user interface to present a follow indicator to alert the user of an option to follow the at least one new thread.

The features described above provide a computing interface that enables a user to focus on a specific chat room or other messaging instance instead of an entire corpus of messages. This avoids the issue of the user having to scroll through a channel to find the threads. The GUI supports easily finding threads in a space, quickly identify the threads with the newest replies, and track those threads the user is following. Also, the GUI help the user identify threads that mention them, which can be used to suggest threads to follow.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented method for managing threads in an electronic messaging application, the method comprising:

identifying, by one or more processors associated with the electronic messaging application, a plurality of threads corresponding to the electronic messaging application that are associated with a user account;

determining, by the one or more processors, whether there are any new replies associated with any of the plurality of threads since a prior access of the electronic messaging application by the user account;

in response to determining that there is at least one new reply associated with at least one of the plurality of threads, modifying a user interface for the electronic messaging application to alert a user of the user account of the at least one new reply;

generating for display via the user interface, by the one or more processors, a snippet of the original message for that thread, wherein the snippet includes a number of lines of the original message based on a display size or a display type of a display device associated with the user account and a number of other threads to be presented;

generating for display via the user interface, by the one or more processors, indicia corresponding to a pair of filters, a first one of the pair of filters for visually indicating unread mentions of the user account in the plurality of threads, and a second one of the pair of filters for visually indicating any threads being followed by the user account;

upon selection of the first one of the pair of filters, identifying instances of the unread mentions of the user account in the plurality of threads; and generating, for display within a panel of the user interface presenting a set of active threads of the plurality of threads, one or more chips to illustrate each active thread including the instances of the unread mentions of the user account.

2. The method of claim 1, wherein the user interface is configured to present at least a subset of the plurality of threads, the presentation of each thread in the subset including one or more of (i) user indicia of a user who sent an original message on which that thread is based, (ii) a timestamp of when the original message for that thread was sent, (iii) a timestamp of a latest reply in that thread, or (iv) an indication of one or both of a number of replies or number of unread replies in that thread.

3. The method of claim 2, wherein the user indicia include one or both of an avatar or a name of the user who sent the original message.

4. The method of claim 1, wherein the snippet includes up to three lines of the original message.

5. The method of claim 1, wherein the user interface is configured to present at least a subset of the plurality of threads in appearance that is variable based on the display size or the display type.

6. The method of claim 1, wherein the indicia corresponding to the pair of filters is displayable adjacent to a panel of the user interface presenting a set of active threads of the plurality of threads.

7. The method of claim 1, the method further comprising:

upon selection of the second one of the pair of filters, identifying instances of the threads currently being followed by the user account; and generating, for display within a panel of the user interface presenting a set of active threads of the plurality of threads, one or more chips to illustrate each active thread currently being followed by the user account.

8. The method of claim 1, wherein modifying the user interface includes modifying a thread panel to show active threads having new replies.

9. The method of claim 1, further comprising:

receiving an indication of user input associated with a given one of the plurality of threads; and in response to receiving the indication, modifying the user interface to identify that the given thread is selectable.

10. The method of claim 1, further comprising:

determining, by the one or more processors, whether there are any new threads corresponding to the electronic messaging application; and upon determining that there is at least one new thread, configuring the user interface to present a follow indicator to alert the user of an option to follow the at least one new thread.

11. A computing system configured to manage threads in an electronic messaging application, the computing system comprising:

memory configured to store data associated with the electronic messaging application; and one or more processors operatively coupled to the memory and configured to:

identify a plurality of threads corresponding to the electronic messaging application that are associated with a user account;

determine whether there are any new replies associated with any of the plurality of threads since a prior access of the electronic messaging application by the user account;

in response to determining that there is at least one new reply associated with at least one of the plurality of threads, modify a user interface for the electronic messaging application to alert a user of the user account of the at least one new reply;

generate, for display on the user interface, by the one or more processors, a snippet of the original message for that thread, wherein the snippet includes a number of lines of the original message based on a display size or a display type of a display device associated with the user account and a number of other threads to be presented;

generate, for presentation via the user interface, indicia corresponding to a pair of filters, a first one of the pair of filters to visually indicate unread mentions of the user account in the plurality of threads, and a second one of the pair of filters to visually indicate any threads being followed by the user account;

upon selection of the first one of the pair of filters, identify instances of the unread mentions of the user account in the plurality of threads; and generate, for display within a panel of the user interface presenting a set of active threads of the plurality of threads, one or more chips to illustrate each active thread including the instances of the unread mentions of the user account.

12. The computing system of claim 11, wherein the user interface is configured to present at least a subset of the plurality of threads, the presentation of each thread in the subset including one or more of (i) user indicia of a user who sent an original message on which that thread is based, (ii) a timestamp of when the original message for that thread was sent, (iii) a timestamp of a latest reply in that thread, or (iv) an indication of one or both of a number of replies or number of unread replies in that thread.

13. The computing system of claim 12, wherein:

the user indicia include one or both of an avatar or a name of the user who sent the original message; and the user interface is variable in appearance based on the display size or the display type.

14. The computing system of claim 11, wherein the indicia corresponding to the pair of filters is displayable adjacent to a panel of the user interface presenting a set of active threads of the plurality of threads.

15. The computing system of claim 11, wherein the one or more processors are further configured to:

upon selection of the second one of the pair of filters, identify instances of the threads currently being followed by the user account; and generate, for display within a panel of the user interface presenting a set of active threads of the plurality of threads, one or more chips to illustrate each active thread currently being followed by the user account.

16. The computing system of claim 11, wherein modification of the user interface includes modification of a thread panel to show active threads having new replies.

17. The computing system of claim 11, wherein the one or more processors are further configured to:

receive an indication of user input associated with a given one of the plurality of threads; and in response to receiving the indication, modify the user interface to identify that the given thread is selectable.

18. The computing system of claim 11, wherein the one or more processors are further configured to:

determine whether there are any new threads corresponding to the electronic messaging application; and upon determination that there is at least one new thread, configure the user interface to present a follow indicator to alert the user of an option to follow the at least one new thread.

* * * * *